(12) United States Patent
Herranz Gracia et al.

(10) Patent No.: US 9,531,304 B2
(45) Date of Patent: Dec. 27, 2016

(54) METHOD AND DEVICE FOR OPERATING AN ELECTRICAL MACHINE HAVING SEPARATE EXCITATION

(75) Inventors: Mercedes Herranz Gracia, Tauberbischofsheim (DE); Stefan Kolmorgen, Tiefenbronn (DE); Stefan Spannhake, Markgroeningen (DE); Yves Challand, Mannheim (DE); Daniel Raichle, Vaihingen (DE); Mario Beyer, Markgroeningen (DE); Dragan Mikulec, Erlangen (DE); Gunther Goetting, Stuttgart (DE); Alexander Scheidle, Stutensee (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 13/990,898

(22) PCT Filed: Sep. 30, 2011

(86) PCT No.: PCT/EP2011/067106
§ 371 (c)(1),
(2), (4) Date: Jan. 9, 2014

(87) PCT Pub. No.: WO2012/072314
PCT Pub. Date: Jun. 7, 2012

(65) Prior Publication Data
US 2014/0125268 A1    May 8, 2014

(30) Foreign Application Priority Data
Dec. 2, 2010   (DE) .......................... 10 2010 062 338

(51) Int. Cl.
*H02P 6/08*    (2016.01)
*H02P 9/30*    (2006.01)
(Continued)

(52) U.S. Cl.
CPC ................. *H02P 6/08* (2013.01); *G05D 23/20* (2013.01); *H02P 9/30* (2013.01); *H02P 9/48* (2013.01);
(Continued)

(58) Field of Classification Search
CPC ......... H05K 7/20209; H02H 7/08; H02P 6/00; H02P 6/08; H02P 9/30; H02P 9/48; H02P 29/0077; H02P 101/45; G06F 1/189; G05D 23/20
(Continued)

(56) References Cited

U.S. PATENT DOCUMENTS 5,123,081 A * 6/1992 Bachman ............. H02H 7/0852
                                                      318/472
5,305,234 A * 4/1994 Markus et al. ................ 702/132
(Continued)

FOREIGN PATENT DOCUMENTS

CN    1287710    3/2001
CN    101841300    9/2010
(Continued)

*Primary Examiner* — Rita Leykin
(74) *Attorney, Agent, or Firm* — Norton Rose Fulbright US LLP; Gerard Messina

(57) ABSTRACT

A method and a device for operating an electrical machine having separate excitation, especially a synchronous machine. With the aid of a sensor system, a variable characterizing a rotor temperature and/or a stator temperature are/is determined, and an excitation current and stator currents for the electrical machine are specified by a control unit as a function of the variable characterizing the rotor temperature and/or the stator temperature, at least in specifiable operating ranges.

13 Claims, 1 Drawing Sheet

(51) Int. Cl.
  *H02P 9/48*    (2006.01)
  *H02P 29/00*   (2016.01)
  *G05D 23/20*   (2006.01)
  *H02P 101/45*  (2015.01)

(52) U.S. Cl.
  CPC ....... *H02P 29/0077* (2013.01); *H02P 2101/45* (2015.01)

(58) Field of Classification Search
  USPC .................... 318/471, 472, 473, 432, 706
  See application file for complete search history.

(56) References Cited

U.S. PATENT DOCUMENTS

| | | | | |
|---|---|---|---|---|
| 5,321,308 | A | 6/1994 | Johncock | |
| 5,502,368 | A * | 3/1996 | Syverson | H02J 7/1438 310/181 |
| 5,712,802 | A * | 1/1998 | Kumar et al. | 702/132 |
| 6,236,134 | B1 * | 5/2001 | Syverson | H02K 1/2773 310/156.53 |
| 6,335,606 | B1 * | 1/2002 | Minagawa | H02K 11/048 310/144 |
| 6,359,421 | B1 * | 3/2002 | Mueller | H02P 9/30 322/20 |
| 6,700,236 | B2 * | 3/2004 | Umeda | H02K 3/12 310/179 |
| 6,737,767 | B2 * | 5/2004 | Berggren | H02J 3/1885 310/51 |
| 7,099,793 | B2 * | 8/2006 | Rechberger | 702/130 |
| 7,498,775 | B2 * | 3/2009 | Swahn | H02P 9/02 322/22 |
| 7,615,951 | B2 * | 11/2009 | Son et al. | 318/432 |
| 7,960,928 | B2 * | 6/2011 | Tang | 318/400.09 |
| 8,421,391 | B2 * | 4/2013 | Yeh | G01K 7/42 318/400.15 |
| 8,487,575 | B2 * | 7/2013 | Yeh | H02P 29/0072 318/432 |
| 8,581,533 | B2 * | 11/2013 | Hayashi | H02P 29/0038 310/315 |
| 9,054,613 | B2 * | 6/2015 | Hanada | H02P 27/08 |
| 2002/0157408 | A1 * | 10/2002 | Egawa | F25B 49/025 62/228.1 |
| 2005/0184689 | A1 * | 8/2005 | Maslov et al. | 318/254 |
| 2010/0156338 | A1 * | 6/2010 | Lu | H02P 29/0055 318/798 |
| 2011/0279074 | A1 * | 11/2011 | Yeh et al. | 318/432 |

FOREIGN PATENT DOCUMENTS

| | | |
|---|---|---|
| DE | 198 49 889 | 5/2000 |
| DE | 10 2007 053755 | 5/2009 |
| DE | 10 2009 01294 | 10/2010 |

* cited by examiner

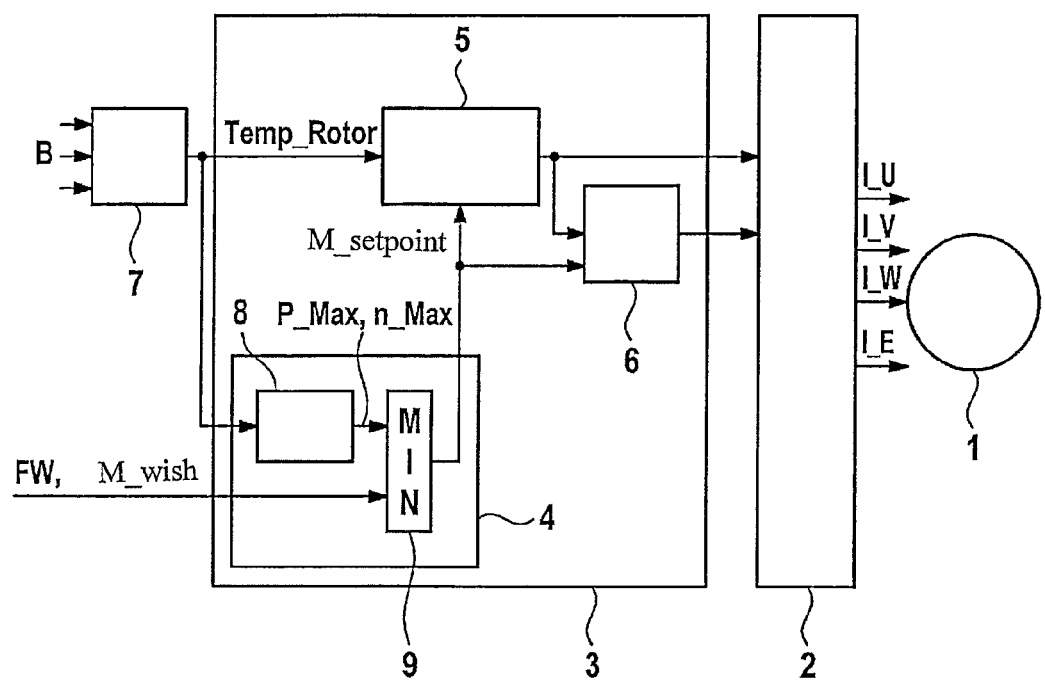

METHOD AND DEVICE FOR OPERATING AN ELECTRICAL MACHINE HAVING SEPARATE EXCITATION

FIELD OF THE INVENTION

The present invention relates to a method and a device for operating an electrical machine having separate excitation, especially a synchronous machine.

BACKGROUND INFORMATION

According to national and regional standards, the rated active or nominal power of an electrical machine is indicated as a function of the operating type. In order to avoid permanent damage to components of the electrical machine, the electrical machines are configured so that the indicated rated power will not be exceeded or the power is restricted with the aid of suitable monitoring of voltages and/or currents and/or temperatures, as the case may be. This power restriction provided for component protection is frequently also referred to as "de-rating".

In various applications of an electrical machine, such as in the automotive sector, it is believed that special requirements and marginal conditions must be taken into account, which results in the goal of setting up the electrical machine so that the highest possible output density is achieved at the smallest size possible.

It is also believed to be understood to use electrical machines as drive units in vehicles. In cases where an electrical machine is used as a drive unit in an electric or hybrid vehicle, it must also be taken into account in the configuration of the electrical machine that the operational readiness of the vehicle has to be ensured at all times; furthermore, a power desired by the driver or a torque that satisfies the driver demand must be able to be provided without fail. In such an application, in particular, the goal of the design and the operating strategy of the electrical machine thus must consist of minimizing the occurrence of an automatic power restriction for component protection purposes.

As a rule, electrical machines in the form of polyphase machines, especially polyphase synchronous machines, which are operated in combination with pulse-controlled inverters, often also simply called inverters, may be used as drives in hybrid and electric vehicles. The electrical machines are selectively operated in motor operating mode or generator operating mode. In motor operation, the electrical machine generates a drive torque which, when used in a hybrid vehicle, assists an internal combustion engine, such as in an acceleration phase. In generator operation, the electrical machine generates electrical energy, which is stored in an energy store, for example a traction battery.

Depending on the driver's intentions and possibly additional operating parameters of the vehicle, a working point of the electrical machine is specified, which is defined by the torque and the engine speed of the electrical machine. In the case of electrical machines having separate excitation, the working point is adjustable by appropriate input of the excitation current and the stator or phase current. It is known and common to regulate an electrical machine having separate excitation in a predefined working point using an optimal efficiency factor, which means that the excitation current or the stator currents is specified so that the desired working point is reached at optimum efficiency. For example, from the German patent DE 198 49 889 A1, a method is discussed for controlling an electrical machine in a manner that is optimized with regard to power and efficiency; in this method, at least three control ranges are formed in which the control of an excitation current and of phase currents takes place according to different criteria, the excitation current and the stator currents being freely selectable for all rotational speeds and desired powers with regard to amount and phase.

SUMMARY OF THE INVENTION

The exemplary embodiments and/or exemplary methods of the present invention provide a method for operating an electrical machine having separate excitation, especially a synchronous machine; in this method, a variable is determined which characterizes a rotor temperature and/or a stator temperature, and an excitation current as well as stator currents are stipulated for the electrical machine as a function of the variable characterizing the rotor temperature and/or the stator temperature, at least in specifiable operating ranges.

The exemplary embodiments and/or exemplary methods of the present invention also provide a device for operating an electrical machine having separate excitation, especially a synchronous machine, equipped with a sensor system for recording at least one variable that characterizes a rotor temperature and/or a stator temperature, as well as a control unit, which specifies an excitation current and stator currents for the electrical machine as a function of the variable characterizing the rotor temperature and/or the stator temperature, at least in specifiable operating ranges.

In electrical machines it is often possible to cool only the stator, in exceptional cases also only the rotor, with the aid of an appropriate cooling system such as a water cooling system, for instance. In contrast, the other component, i.e., usually the rotor, remains uncooled. However, this makes the uncooled component particularly susceptible to overheating and frequently constitutes the trigger for a power reduction aimed at protecting components. An electrical machine having separate excitation offers the possibility of setting a specified working point of the electrical machine via a plurality of combinations of excitation current and associated stator currents, the current intensities influencing the thermal development in the particular components to a considerable degree. The exemplary embodiments and/or exemplary methods of the present invention are based on the core idea of shifting the current distribution between the rotor (excitation current) and the stator (stator currents) possibly in such a way that the losses in the rotor or stator for a particular working point are minimized, so that the heat development and the temperature in the corresponding component are restricted. Whether a modified current distribution is required and/or meaningful is specified with the aid of a variable that characterizes the rotor temperature and/or the stator temperature, and possibly additional operating parameters of the vehicle. As a result, the exemplary embodiments and/or exemplary methods of the present invention offer the possibility of finding a meaningful compromise between an operation of the electrical machine optimized under the aspect of efficiency and under the aspect of availability.

With the aid of the exemplary embodiments and/or exemplary methods of the present invention, the temperature in the rotor or in the stator is able to be actively influenced already at a time when no power reduction for component protection is required yet. Expected overheating of the uncooled component, in particular, is detectable in a timely manner, and appropriate countermeasures are able to be taken. In many operating scenarios it is therefore possible to entirely avoid a power reduction for protecting components. The power loss in the cooled component additionally produced by the modified current distribution is able to be absorbed by the cooling system provided for this purpose.

According to one specific embodiment of the present invention, at least three operating ranges are formed as a function of the variable characterizing the rotor temperature and/or the stator temperature.

In order to operate the electrical machine in the widest possible operating range in an efficiency-optimized manner and thus as economically as possible, the excitation current and the stator currents for a predefined working point of the electrical machine, which is defined by a torque and an engine speed of the electrical machine, are specified in efficiency-optimized fashion independently of the variable characterizing the rotor temperature and/or the stator temperature in a first operating range, in which the rotor temperature and/or the stator temperature lie(s) below a specifiable first limit value. The first limit value therefore characterizes a rotor or stator temperature, up to which no intervention is required in the current distribution between rotor and stator, since no overheating is to be expected.

In a second operating range, in which the rotor temperature and/or the stator temperature lie(s) above the first limit value but below a specifiable second limit value, the current distribution according to the present invention takes effect, and the excitation current and the stator currents are specified as a function of the variable characterizing the rotor temperature and/or the stator temperature. However, in contrast to the "classic" component protection, the maximally permitted power of the electrical machine is not reduced here. While it may be true that the electrical machine is no longer operating in efficiency-optimized manner in this operating range, greater power availability is obtained, i.e., longer availability of a requested power or a requested torque.

In order to ensure the component protection nevertheless, if warranted, the maximally permitted power of the electrical machine is reduced in a third operating range, in which the rotor temperature and/or the stator temperature lie(s) above the second limit value.

In the third operating range, the excitation current and the stator currents may be specified in efficiency-optimized manner, independently of the variable characterizing the rotor temperature and/or the stator temperature. As an alternative, however, it is also conceivable to specify the excitation current and the stator currents in efficiency-optimized manner as a function of the variable characterizing the rotor temperature and/or the stator temperature in the third operating range as well. Because of the selective influencing of the further heating of the rotor and/or the stator which is realizable in this manner, the required reduction of the maximally permitted power may also be of smaller magnitude.

If the electrical machine is used as power unit for a vehicle, then the excitation current and the stator currents for the electrical machine are able to be specified as a function of additional operating parameters of the vehicle in the specifiable operating ranges. In the same way, the first and/or the second limit value is/are able to be specified as a function of additional operating parameters of the vehicle in this case.

This offers the possibility of optimally adapting the distribution of the currents to the rotor (excitation current) and the stator (stator currents) to the specific operating conditions. For instance, information from a navigation system pertaining to the route still to be covered until reaching the destination may be taken into account. If longer travel on a major highway is to be expected, for example, it is possible, on the one hand, to lower the first limit value in order to ensure the earliest possible active influencing of the rotor or stator temperature. On the other hand, it is possible to lower the excitation current in the second operating range more drastically than during an interurban drive, for example, so that overheating is avoided in reliable manner despite the high power demands to be expected.

Additional features and advantages of specific embodiments of the present invention result from the following description, with reference to the attached drawing, which shows a schematic block diagram of a device according to the present invention.

BRIEF DESCRIPTION OF THE DRAWING

The FIGURE shows a schematic block diagram of a device according to the present invention.

DETAILED DESCRIPTION

FIG. 1 schematically shows a block diagram of a device according to the present invention for operating an electrical machine 1 having separate excitation, the device being implemented as a polyphase machine, which may be a polyphase synchronous machine, which is used as drive unit of an otherwise not depicted electrical vehicle. It should be assumed by way of example that only the stator of electrical machine 1 is cooled by an associated cooling system such as a water cooling system. In contrast, the rotor is not cooled and thus constitutes the more critical component of electrical machine 1 with regard to potential overheating. The power and operating mode of electrical machine 1 are defined by a control circuit 2. Control circuit 2 includes components for a closed-loop control of stator currents I_U, I_V and I_W, such as a pulse-controlled inverter, and also components for a closed-loop control of an excitation current I_E of electrical machine 1. Stator currents I_U, I_V and I_W to be adjusted, and excitation current I_E to be adjusted are specified to control circuit 2 by a control unit 3. Control unit 3 includes a power input 4, an excitation-current determination 5, and a stator-current determination 6. Based on a setpoint torque m_Soll input by power input 4, an excitation current I_E is ascertained by excitation-current determination 5. Based on this excitation current I_E, stator currents I_U, I_V and I_W required to adjust a specified working point of electrical machine 1 are then ascertained in stator-current determination 6. The working point of electrical machine 1 is defined by a torque and an engine speed of electrical machine 1 and specified, in a generally known manner, as a function of a driver wish FW, i.e., a desired torque m_wish requested by the driver, and possibly additional operating parameters of the vehicle.

Both power input 4 and excitation-current determination 5 are connected to a sensor system 7, which records a variable that characterizes rotor temperature Temp_Rotor, especially rotor temperature Temp_Rotor itself. The direct recording of rotor temperature Temp_Rotor is technically complex due to the rotor movement. As an alternative to a direct temperature measurement in the rotor, rotor temperature Temp_Rotor may therefore also be determined with the aid of generally known methods on the basis of more easily detectable electric operating quantities B of electrical machine 1. Excitation-current determination 4 compares rotor temperature Temp_Rotor to a specifiable first limit value. As long as rotor temperature Temp_Rotor lies below the first limit value (first operating range), excitation current I_E for the specified working point of electrical machine 1 is specified independently of rotor temperature Temp_Rotor in the generally known manner, such as with the aid of a characteristics map, in a manner optimized for efficiency.

If rotor temperature Temp_Rotor exceeds the first limit value (second operating range), excitation current I_E and stator currents I_U, I_V and I_W are specified as a function of the rotor temperature or the variable that characterizes it. Specifically, the current distribution between rotor and stator is shifted in such a way that the current in the rotor (excitation current) is reduced at the expense of the stator currents. This reduces the losses and thus the heat development in the rotor. As a result, it is possible to influence rotor temperature Temp_Rotor in selective manner; in particular, a further increase in rotor temperature Temp_Rotor is able to be avoided, without the need to reduce a maximally permitted power P_Max of electrical machine 1. Since the output of electrical machine 1 is not reduced, a reduction of excitation current I_E necessarily leads to an increase in stator currents I_U, I_V and I_W. However, the additional power loss produced inside the stator is able to be absorbed via the cooling system of the stator.

In order to reliably prevent permanent damage to components of electrical machine 1, a "component protection" is provided. In this context, power input 4 ascertains maximally permitted power P_Max or a maximally permitted torque m_Max as a function of rotor temperature Temp_Rotor, in a block 8. Rotor temperature Temp_Rotor is compared to a second limit value, which lies above the first limit value, toward this end. If the second limit value (third operating range) is exceeded, maximally permitted power P_Max of electrical machine 1 is reduced in order to avoid permanent damage to components of electrical machine 1. In a block 9, maximally permitted power P_Max or maximally permitted torque m_Max is compared to the driver wish, i.e., desired torque m_wish requested by the driver, and the smaller value is forwarded to excitation-current determination 5. In the third operating range, excitation current I_E and stator currents I_U, I_V and I_W are able to be specified independently of the variable characterizing the rotor temperature, in a manner that is optimized with regard to efficiency. As an alternative, however, it is also possible to specify excitation current I_E and stator currents I_U, I_V and I_W as a function of the variable characterizing the rotor temperature in the third operating range as well.

This reduction of the maximally permitted power in the third operating range has the result that the working point of electrical machine 1 is able to be shifted, i.e., when the driver-requested desired torque exceeds maximally permitted power P_Max or maximally permitted torque m_Max. The exemplary embodiments and/or exemplary methods of the present invention have the effect that this third operating range, in which maximally permitted power P_Max of electrical machine 1 is reduced, becomes active much less often than in the methods and devices known from the related art.

This effect may even be amplified if excitation current I_E and stator currents I_U, I_V and I_W for electrical machine 1, and/or the limit values in the second and possibly also in the third operating range are specified as a function of additional operating parameters of the vehicle. This makes it possible to optimally adapt the instant and the extent of the current shift between stator and rotor to the individual operating situation of the vehicle.

The exemplary embodiments and/or exemplary methods of the present invention were discussed based on an electrical machine having a cooled stator and uncooled rotor, but it is applicable in an analogous manner also to electrical machines having a cooled rotor and uncooled stator. In the same way, the exemplary embodiments and/or exemplary methods of the present invention are not restricted to polyphase machines, but can also be used for electrical machines having more or fewer phases. Naturally, the exemplary embodiments and/or exemplary methods of the present invention are also usable for electrical machines outside of the automotive sector.

What is claimed is:

1. A method for operating an electrical machine having separate excitation, the method comprising:
   determining a variable that characterizes a stator temperature; and
   shifting a current distribution between an excitation current and stator currents for the electrical machine at least in specifiable operating ranges, as a function of the variable characterizing the stator temperature,
   wherein in a first operating range, in which the stator temperature lie(s) below a specifiable first limit value, the excitation current and the stator currents for a specified working point of the electrical machine, which is defined by a torque and an engine speed, are specified in efficiency-optimized manner independently of the stator temperature.

2. The method of claim 1, wherein at least three operating ranges are formed as a function of the variable characterizing at least one of a rotor temperature and the stator temperature.

3. The method of claim 2, wherein in a second operating range, in which the at least one of the rotor temperature and the stator temperature lie(s) above the first limit value but below a predefinable second limit value, the excitation current and the stator currents of the electrical machine are specified as a function of the variable characterizing the at least one of the rotor temperature and the stator temperature, without reducing a maximally allowed power of the electrical machine in the process.

4. The method of claim 2, wherein in a third operating range, in which the at least one of the rotor temperature and the stator temperature lie(s) above the second limit value, the maximally permitted power of the electrical machine is reduced.

5. The method of claim 4, wherein the excitation current and the stator currents in the third operating range may be specified in efficiency-optimized manner independently of the variable characterizing the at least one of the rotor temperature and the stator temperature.

6. The method of claim 4, wherein the excitation current and the stator currents in the third operating range are specified as a function of the variable characterizing the at least one of the rotor temperature and the stator temperature.

7. The method of claim 1, wherein the electrical machine is used as drive unit for a vehicle, and the excitation current and the stator currents for the electrical machine in the specifiable operating ranges are specified as a function of additional operating parameters of the vehicle.

8. The method of claim 1, wherein the electrical machine serves as drive unit of a vehicle, and at least one of the first limit value and the second limit value is specified as a function of additional operating parameters of the vehicle.

9. The method of claim 1, wherein the electrical machine is a synchronous machine.

10. The method of claim 1, wherein a variable that characterizes a rotor temperature is also determined, and wherein the current distribution between the excitation current and stator currents for the electrical machine is shifted, at least in specifiable operating ranges, as a function of the variable characterizing the rotor temperature.

11. A device for operating an electrical machine having separate excitation, comprising:
- a sensor system for detecting a variable characterizing a stator temperature; and
- a control unit, which shifts a current distribution between an excitation current and stator currents for the electrical machine as a function of the variable characterizing the stator temperature, at least in specifiable operating ranges,
- wherein in a first operating range, in which the stator temperature lie(s) below a specifiable first limit value, the excitation current and the stator currents for a specified working point of the electrical machine, which is defined by a torque and an engine speed, are specified in efficiency-optimized manner independently of the stator temperature.

12. The device of claim 11, wherein the electrical machine is a synchronous machine.

13. The device of claim 11, wherein the sensor system also detects a variable characterizing the rotor temperature, and wherein the control unit shifts the current distribution between the excitation current and stator currents for the electrical machine as a function of the variable characterizing the rotor temperature, at least in specifiable operating ranges.

* * * * *